United States Patent [19]
Cooley et al.

[11] Patent Number: 5,546,383
[45] Date of Patent: Aug. 13, 1996

[54] MODULARLY CLUSTERED RADIOTELEPHONE SYSTEM

[76] Inventors: David M. Cooley, 547 Beverly Blvd., Upper Darby, Pa. 19082; Joseph J. DiGiovanni, 891 W. King Rd., Malvern, Pa. 19355; John D. Kaewell, 2295 Rittenhouse Square, Bensalem, Pa. 19020; Scott D. Kurtz, 104 W. Bluebell La., Mt. Laurel, N.J. 08054; Mark A. Lemmo, 3972 Longfellow Rd., Huntington Valley, Pa. 19006; Michael W. Regensburg, 305 Windsor La., Marlton, N.J. 08053; David Vessal, 314 Dudley Ave., Narberth, Pa. 19072; Eric Johns, 1255 E. Evergreen Dr., Phoenixville, Pa. 19460

[21] Appl. No.: 129,444

[22] Filed: Sep. 30, 1993

[51] Int. Cl.$^6$ ...................................................... H04J 4/00
[52] U.S. Cl. ............................. 370/50; 370/70; 370/95.3
[58] Field of Search ................................. 370/95.1, 95.3, 370/100.1, 70, 69.1, 50, 79; 455/75, 76, 13.2, 13.3, 62, 54.1; 375/8

[56] References Cited

U.S. PATENT DOCUMENTS

| | | | |
|---|---|---|---|
| 4,785,450 | 11/1988 | Bolgiano et al. | 370/95.1 |
| 4,811,420 | 3/1989 | Avis et al. | 455/51.1 |
| 5,325,396 | 6/1994 | Critchlow et al. | 455/76 |

FOREIGN PATENT DOCUMENTS 0329997   8/1989   European Pat. Off.

OTHER PUBLICATIONS

Basic Exchange Telecommunication Radio (BETR) Technology, Robert McGuire, 1988 Proceedings of the National Communications, pp. 1714–1721.

*Primary Examiner*—Douglas W. Olms
*Assistant Examiner*—Min Jung

[57] ABSTRACT

A power-conserving time division multiple access (TDMA) radio telephone system is disclosed in which a cluster of subscriber stations, remote from a base station, employs a common pool of frequency-agile modems each of which digitally synthesizes, on a timeSlot-by-timeSlot basis, the different channel-identifying intermediate frequencies needed to support communications between several of the subscriber stations and the base station. Power conservation is facilitated inter alia by controlling the assignment of modems to calls, maintaining unassigned modems in a powered-down state and by controlling the number of calls using the same time slot. Delay in assigning a powered-down modem to a call is eliminated by making available to all modems the highest quality synchronization information obtained by any of the active modems.

13 Claims, 9 Drawing Sheets

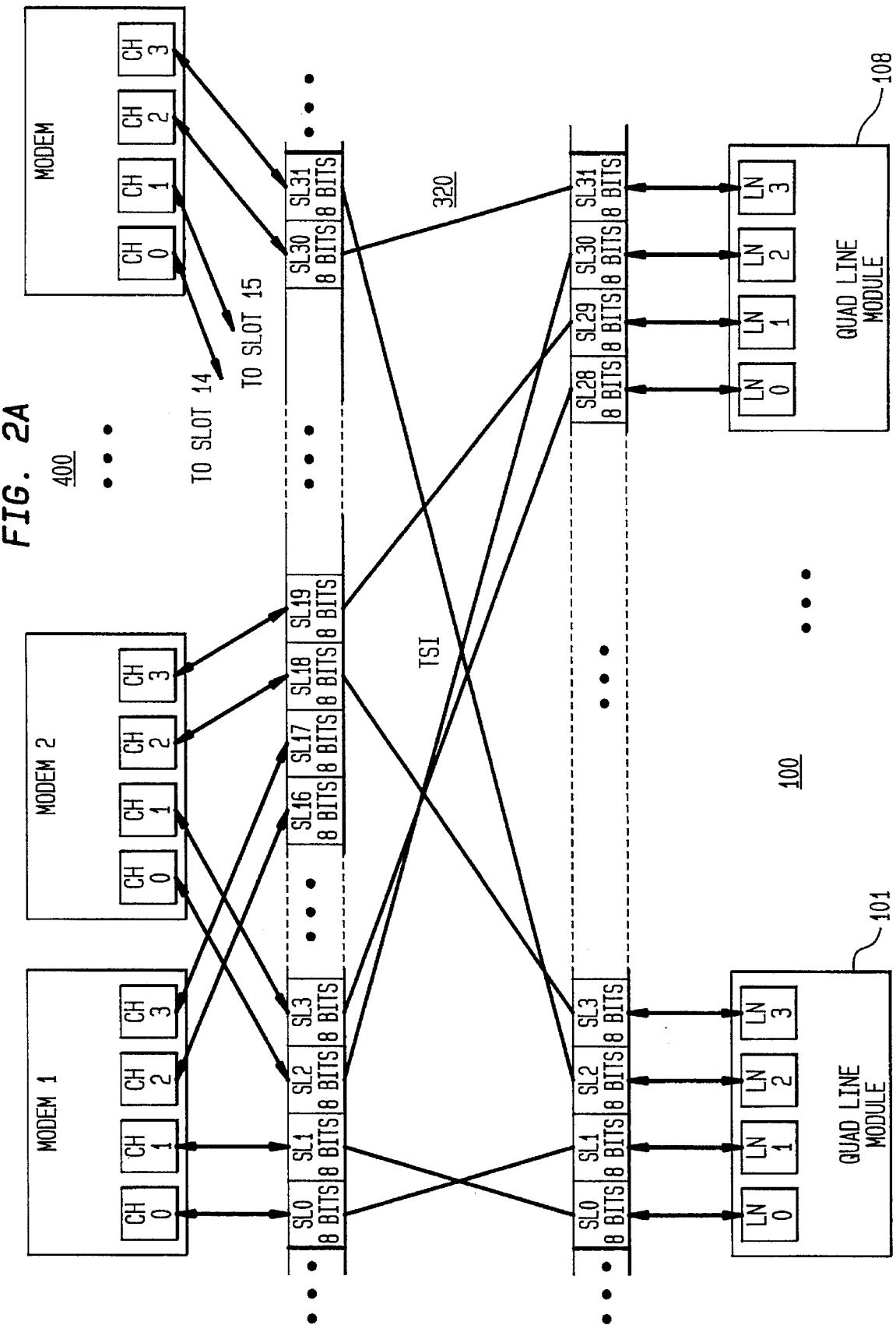

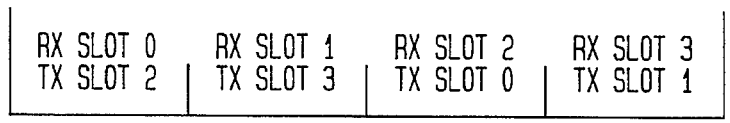
FIG. 2B (16 PSK)
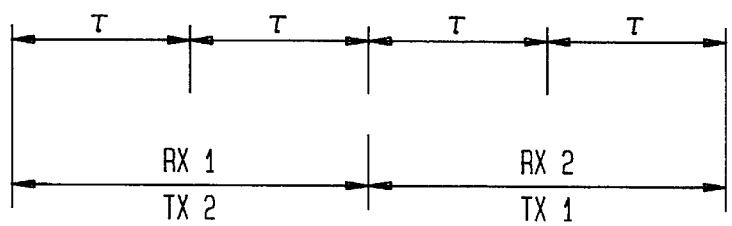
FIG. 2C (QPSK)
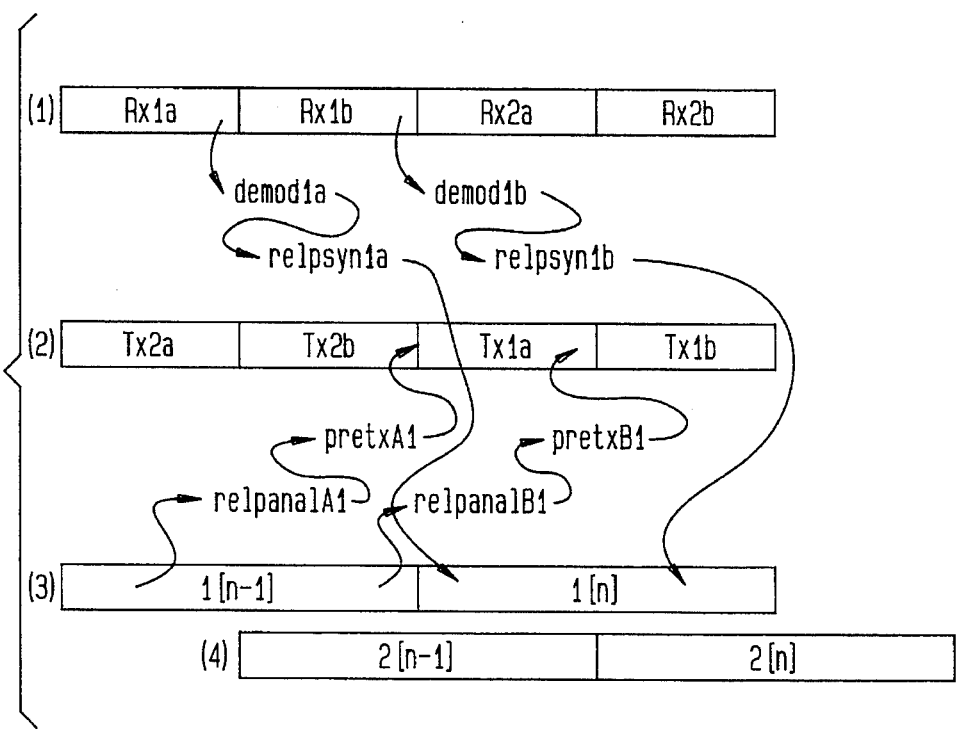
FIG. 2D (QPSK)

MODULARLY CLUSTERED RADIOTELEPHONE SYSTEM

FIELD OF THE INVENTION

This invention relates to radiotelephone systems for serving a plurality of remote subscriber stations and, more particularly, to a radiotelephone system in which certain of said subscriber stations are located in a physically adjacent group.

BACKGROUND OF THE PRIOR ART

A radiotelephone system including a base station for serving remote subscriber stations is described in U.S. Pat. No. 5,119,375. In that system each subscriber station was equipped with a radio that could be instructed by the base station to tune to a particular channel and to employ a particular time slot for the duration of a given conversation. Time division multiplex (TDM) radio channel transmission was employed from the base station to the subscriber stations and time division multiple access (TDMA) transmission from the individual subscriber stations to the base station. The time division of each radio channel into time slots and the compression of speech signals permitted each radio frequency channel to support a number of voice paths equal to the number of time slots. Analog voice signals to and from the public switched telephone network were first converted to 64 kbps μ-law companded pulse coded modulation (PCM) digital samples. Before transmission over the radio channel the digital samples were subjected to voice-compression to reduce the voice information rate from 64 kbps to 14.6 kbps using residual excited linear predictive (RELP) coding. A voice codec and modem were required to be dedicated to a specific frequency and time slot for the duration of a call.

While the foregoing system operated in a highly satisfactory manner in allowing telephone service to be provided especially to areas where wire lines are impractical, the unforeseen growth of such telephone service has given rise to situations in which several subscriber stations are found to lie in close proximity with one another. Initial efforts to lower the per-line cost of serving a group of such closely situated subscriber stations were focused on consolidating the installation and maintenance costs of individual subscriber stations through the sharing of common equipment such as the enclosure, power supply, RF power amplifier and antenna. Thus, in a closely situated group of subscriber stations, each of which could access an RF channel, a single broadband RF power amplifier could be employed to serve the group. However such efforts still required each subscriber line to have its own modem and radio transceiver. The individual transceiver outputs were fed to the common RF power amplifier, which had to be designed to handle a peak power equal to the sum of the power of all of the transceivers in the group of adjacent subscriber stations that could simultaneously be active on the same time slot. It is apparent that further consolidation over that possible in the '375 patent system and a reduction in the peak and average power required would be desirable, especially in remote areas required to be served by solar cell power.

SUMMARY OF THE INVENTION

In accordance with the principles of our invention, per-line costs are reduced for a physically adjacent group of subscriber lines by permitting the lines within such a group to share not only a common power supply and RF power amplifier, but modem, synchronization, IF, up- and down-conversion and controller functions as well, so that significant concentration is achieved. In our system, a small number of modems is provided to serve the multiple subscribers in a physically adjacent group, hereinafter referred to as cluster or, more particularly, as a modular cluster. In an illustrative embodiment, subscriber line circuits and modems are modularized printed circuit cards which plug into a frame employing backplane wiring to distribute timing information and data among the units. Any of the modems may be seized to handle a call for any of the subscribers and each modem may handle calls for several subscribers on successive time slots. The same or a different frequency may be used to support communications for each subscriber on successive time slots.

It is a feature of our invention that the selection from the common pool of frequency-agile modems of the modem to be used to handle a call is controlled to conserve power consumption in two ways. First, a new modem is preferably not seized for use to handle a call until all of the time slots on active modems have been assigned to calls, thereby allowing all not-yet-selected modems to remain in a power-conserving, "powered-down" state. Second, the number of calls using the same time slot (on different frequencies) is controlled to reduce the peak power demand on the RF power amplifier.

It is a further feature of our invention to avoid synchronization delay when it is necessary to seize a powered-down modem for use on a call. Once time slot synchronization with the base station has been established for the first modem of the pool at the cluster, synchronization information is made available to the remaining modems, advantageously over backplane wiring, under control of a microprocessor-based cluster controller. Accordingly, all powered-down modems remain instantly assignable to handle calls without undergoing any delay to become synchronized with the base station's time division frame.

It is a further feature of our invention to classify modem synchronization states according to several synchronization parameters and to derive a confidence factor for each active modem that reflects the reliability of the synchronization parameters and to distribute synchronization information from the modem having the best confidence factor.

BRIEF DESCRIPTION OF THE DRAWINGS

The foregoing and other objects and features of our invention may become more apparent by referring now to the drawing in which:

FIG. 2A shows the association of subscriber line circuits and modems at the time slot interchanger;

FIG. 2B shows the TDMA RF frame allocated for 16PSK time slots;

FIG. 2C shows the TDMA RF frame allocated for QPSK time slots;

FIG. 2D shows the task scheduling between the TDMA time slots and the PCM buffers;

GENERAL DESCRIPTION

Figure 1:
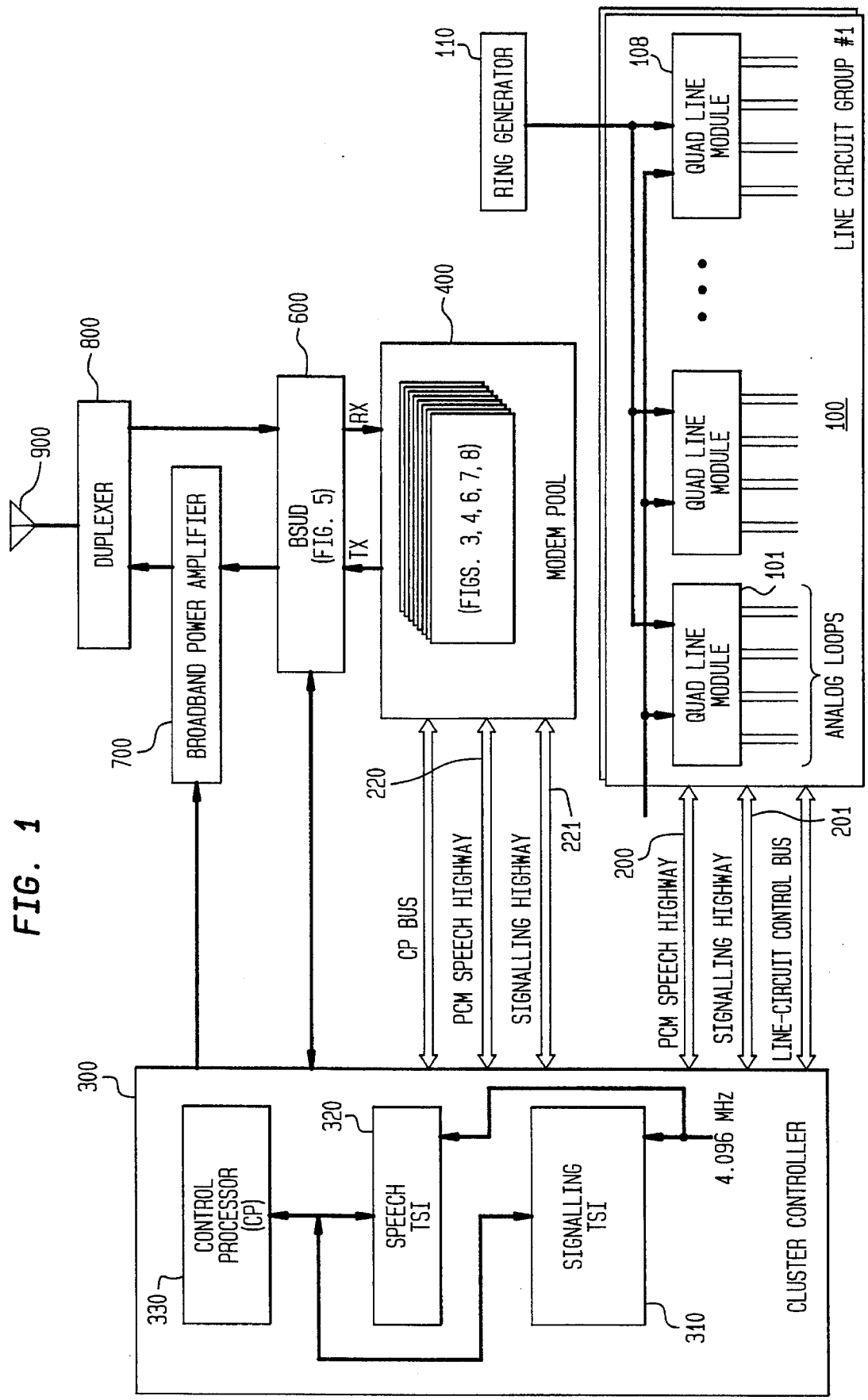
FIG. 1 is a block diagram of a modular cluster having a common pool of frequency agile modems for handling a group of subscriber stations.

FIG. 1 is a block diagram of a modular subscriber cluster that is located remotely from a base station (not shown). The subscriber cluster is termed "modular" because the line circuits 100 and the modems 400 are comprised of plug-in units. Accordingly, the number of plugged-in subscriber line circuits 100 will depend on the number of subscribers in the locality and the number of plugged-in modems 400 may be traffic-engineered to handle the amount of traffic expected to be generated by the number of line circuits 100. Line circuits 100 are contained on quad line module cards 101–108, each of which serves four subscriber lines. Eight such quad line modules provide loop control functions to a line group of 32 subscriber lines and circuits 100 may contain multiple line groups.

Each line circuit on each quad line module 101–108 is given a dedicated PCM time slot appearance in PCM speech highway 200 and in signaling highway 201. The quad line modules 101–108 include voice codecs (not shown) to encode subscriber loop analog voice onto PCM data highway 200. Subscriber loop signaling information is applied to signaling highway 201 by a subscriber line interface circuit SLIC (not shown). Either μ-law or A-law PCM coding may be used.

The connection of a particular one of modems 400 to handle a call from or to a particular one of the line circuits on one of quad line modules 101–108 is made via time slot interchangers 310 and 320, as instructed by cluster controller 300. PCM data time slot interchanger 320 conveys speech samples between the PCM speech highway 200 serving line modules 101–108 and the PCM speech highway 220 serving modem pool 400. Signaling time slot interchanger 310 conveys signalling information between signalling highway 201 serving the modules 100 and signalling highway 221 serving modem pool 400.

Two RF channels are required for a telephone conversation, one for transmissions from the base station to the subscriber (the 'forward' channel) and one from the subscriber to the base station (the 'reverse' channel). The forward and reverse channel frequencies are assigned by the telecommunications authority and in a typical example may be separated from each other by 5 MHz. The path of the forward channel radio signal received at the cluster from the base station may be traced from cluster antenna 900 and duplexer 800 to block synthesizer up/down converter (BSUD) 600. In block converter 600 the RF signal is limited, band-pass filtered and down-converted from the 450 MHz, 900 MHz or other high, or ultra-high frequency RF band to an IF signal in the 26–28 MHz range. The IF signal is delivered to modems 400 which process the signal for delivery to the subscriber line circuits via the time slot interchangers in the cluster controller 300.

Figure 3:
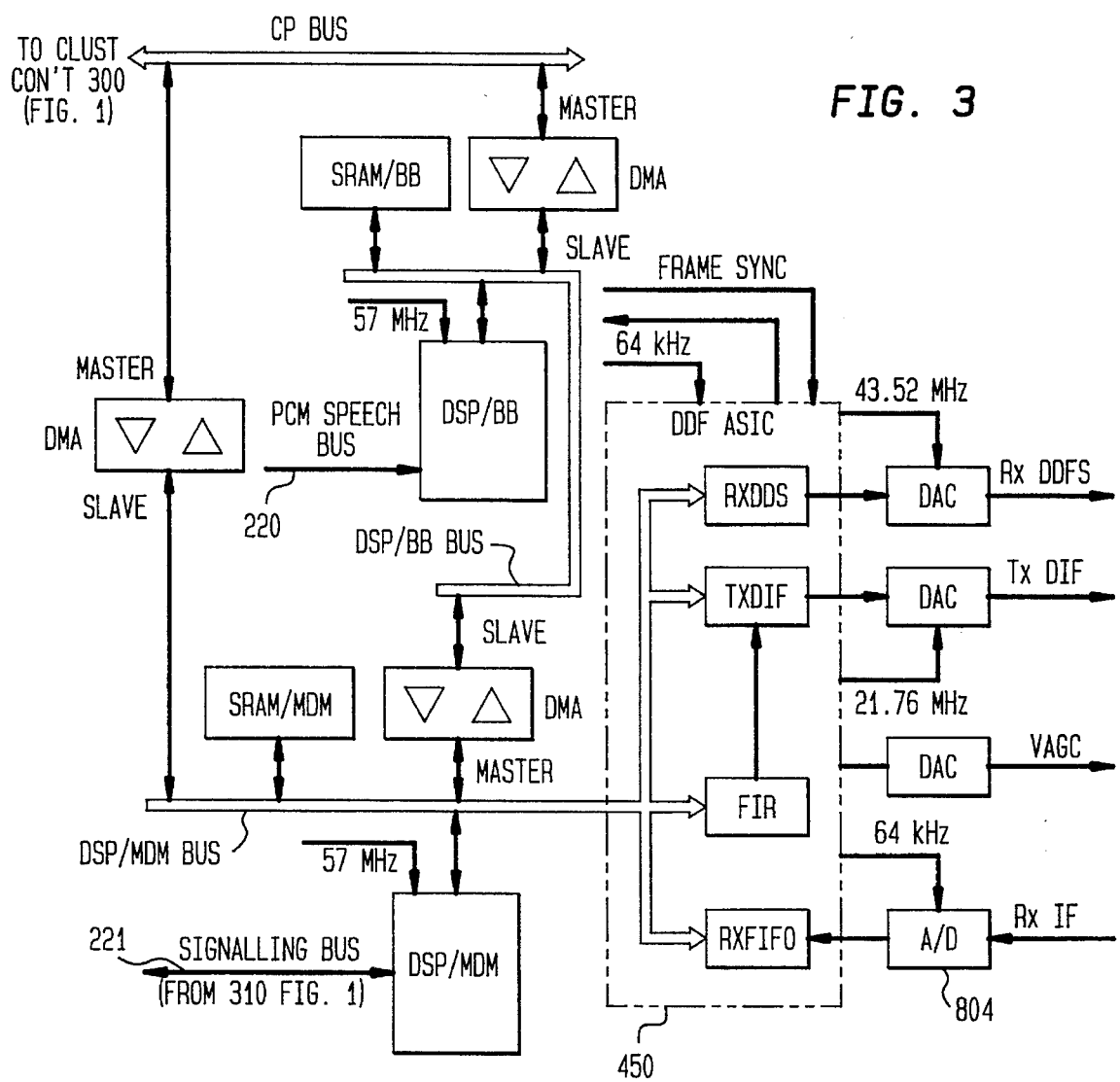
FIG. 3 shows the principle circuit elements of a frequency agile modem module.

The modems each include a baseband digital signal processor (see FIG. 3, DSP/BB) and a modem processor (see FIG. 3, DSP/MDM). In the forward channel direction, modem processor DSP/MDM demodulates the IF signal received from block converter 600 and transfers the data to baseband processor DSP/BB which expands the demodulated data into μ-law or A-law encoded signals for transmission through time slot interchanger 320 to the line modules. The modem's baseband processor DSP/BB interfaces to modem processor DSP/MDM via a direct memory access (DMA) interface (see FIG. 3) and to the PCM highways through the processor's serial port. In the reverse channel direction, baseband processor DSP/BB converts the μ-law or A-law coded PCM information received from PCM highway 500 into linear form, compresses the linear data using RELP coding and DMA transfers the compressed data to digital signal processor DSP/MDM which modulates the signal for transmission on the radio channel time slot.

As shown in FIG. 2A, each of modems 400 and each of line modules 100 has four dedicated time slot appearances in PCM data time slot interchanger 320 for non-blocking access. Each modem is assigned two adjacent PCM slots in PCM time slots 0–15 and two adjacent PCM time slots in PCM time slots 16–31. As an example, for a particular call, TSI 320 connects line circuit 0 of line module 101 to channel 1 of modem 1, and line circuit 1 of line module 101 is connected to channel 0 of modem 1, and so on. Time slot interchangers 310 and 320 provide a repetitive 125 μS sampling period containing 32 time slots operating at a rate of 2.048 Mbits/sec. During each 125 μS PCM interval, the line modules may send thirty-two, 8-bit bytes of data to time slot interchanger 320 and each modem may receive four of the 8-bit bytes at its baseband processor serial port, packed together as two 16-bit words. Each 16-bit word causes a serial port interrupt on the baseband processor. When the interrupt is received, the baseband processor determines whether the pair of PCM samples contained in the 16-bit word correspond to slots 0 and 1 or to slots 2 and 3. Similarly, during each 125 μS PCM interval, four voice channels of PCM data, packed together as two 16-bit words, may be sent from each baseband processor's serial port to time slot interchanger 320 for delivery to the line modules.

The TDM (RF) frame at the base station is shown in FIGS. 2B and 2C, each having a duration, illustratively, of 45 ms. The 16PSK frame of FIG. 2B has four time slots, each of duration τ, each time slot capable of carrying the different frequencies assigned to the forward and reverse channels of the call. In FIG. 2C the RF frame of the same duration is capable of accommodating the forward and reverse channels of two QPSK modulated calls. It can be appreciated that, alternatively, the TDM frame can carry four 16PSK calls or two QPSK modulated calls.

FIG. 2D illustrates the timing of the tasks performed at the cluster in conveying information between an illustrative TDMA frame carrying QPSK modulated calls and the PCM highway frames. Line (1) represents the buffers for receiving the two QPSK modulated forward channel time slots, Rx1 and Rx2, of the TDMA frame. Demodulation is begun as soon as the receive buffer has received the first half, Rx1a, of the time slot. Line (2) represents the buffers preparing to transmit in the two reverse channel QPSK time slots, Tx1 and Tx2, of a TDMA frame. Note that, at the cluster, the reverse channel time slots are offset from the forward channel time slots so that the subscriber station may avoid the expense and bulk of a duplexer. In addition, the subscriber unit's the reverse channel will be offset so that it will be received at the base station at the proper time taking into account the distance between the subscriber station and the base station. Lines (3) and (4) of FIG. 2D represent the buffers in the SRAM (FIG. 3) of the modem which store the PCM words to and from speech time slot interchanger TSI 320 (FIG. 1).

In normal voice operation, the modem processor DSP/MDM demodulates received forward channel symbols, packs them into a buffer in SRAM/MDM and sends the contents of the buffer to the baseband processor DSP/BB for RELP synthesis (expansion). The baseband processor encodes the expanded data to µ-law or A-law and puts it on the PCM bus for delivery to the line modules. Voice code words are transmitted in every frame during active voice operation. The code word resides at the beginning of the burst between the preamble and voice data on both the forward and reverse channels. The forward channel voice code words contain information that may be used to adjust transmit power and timing. Local loop control information (i.e., onhook, offhook, ring, forward disconnect) is also embedded in these code words. The reverse channel code words contain subscriber station local loop control and forward channel link quality information.

The forward voice codeword is decoded by the modem processor DSP/MDM. The forward voice codeword contains transmit fractional timing control, transmit power level control and local loop control information. The fractional timing and power level control information is averaged out over a frame and the average adjustment made at the end of the frame. The local loop control information is stored locally and changes in loop state are detected and reported to the cluster controller. The local loop control also causes the modem to send out line circuit control over the signalling bus. The reverse voice codeword contains local loop status that is used by the cluster controller and base station to monitor call progress.

The modem processor DSP/MDM performs receive FIR filtering and automatic gain control of the received samples during a receive symbol interrupt service routine. The demodulator routine in the modem processor is called when half a slot of baseband information has been received in the receive buffer. The demodulator operates on the half slot of data and passes the packed output data to the baseband processor DSP/BB for RELP synthesis. Data transfer to and from the baseband processor is controlled so that the RELP input queues are filled before the corresponding synthesis data is required, and RELP output queues are emptied before new analysis (compression) output data arrives. During demodulation, automatic frequency control (AFC), automatic gain control (AGC) and bit tracking processes are performed to maintain close synchronization with the base station.

It should be appreciated that mixed mode operation is possible whereby some time slots in the RF may employ 16PSK modulation while the remaining slots employ QPSK modulation.

Synchronization to the Base Station

Before an RF channel can be used for communication between the base station and the cluster, the cluster must be synchronized to the RF time slot scheme used by the base station (not shown). In accordance with our invention, one or more of modems 400 will be ordered by cluster controller 300 to acquire synchronization with the base station RF frame timing by searching for the channel frequency carrying the radio control channel (RCC) being used by the base station. Cluster controller 300 includes a master control microprocessor 330, illustratively, one employing a Motorola 68000 series processor, which sends control information over the CP bus to the microprocessors in modems 400. On power up, cluster controller 300 down-loads appropriate software and initialization data to modems 400. After the channel frequency is found, the modem must synchronize with the base station time slot by decoding the RCC unique word. As described in the aforementioned '375 patent, the RCC channel is distinguished from other channels in that it has an extended guard interval during its time slot and includes a DBPSK modulated unique word of 8 bits. In order to minimize the possibility of aborting a call if the modem with the active RCC time slot fails and it becomes necessary to assign the RCC time slot to a different modem, time slots are assigned within an active modem so that the synchronization (RCC) time slot (referred to as Rx0 where the four time slots are numbered Rx0 through Rx3, or Rx1 where the time slots are number Rx1 through Rx4), is the last to be filled.

At start-up, all of modems 400 are assumed to be out of synchronization with the base station's RF 45 ms frame. During time slot zero of the RF frame, the base station transmits an RCC message on some RF channel which, when received at the modular cluster, will be decoded to put the cluster into synchronization with the base station's RF time slot frame for all RF channels. Until synchronization with the base station is achieved, each modem generates its own local RF frame sync. Cluster controller 300 next commands one or more modems to hunt for the RCC transmitted by the base station on different RF channels until the RCC is found or all channels have been searched. If all channels have been searched and the RCC has not been found, the controller orders the search to begin again. When a modem finds the RCC, the controller designates it as the RCC modem and distributes its sync information to the remaining modems via the frame sync signal over the backplane.

When the RCC slot search is undertaken, the channel number is used by the modem to digitally sweep a direct digital frequency synthesis (DDFS) local oscillator, illustratively over a 2 MHz range. There are two stages to a modem's acquisition of the RCC channel, coarsely identifying the center frequency and finding the "AM hole", a portion of the RCC time slot where the number of symbols transmitted by the base station does not fill up the entire slot time. Coarse frequency acquisition is based on performing a Hilbert transform of the spectrum of the RCC channel which yields a frequency correction for the local oscillator. This continues until the energy in the upper half of the spectrum approximates that in the lower half.

After coarse frequency acquisition is obtained, illustratively to within an accuracy of 300 Hz of the channel center frequency, a search is made for the AM hole. A number of null signals are transmitted prior to the RCC data. The AM hole is identified by monitoring the amplitude of consecutive received symbols. When twelve consecutive null symbols are detected, an AM strobe signal is output by the modem to indicate the start of an RCC slot and the start of a TDMA frame. This coarsely synchronizes the baseband modem timing to the base station timing. Synchronization need only be performed once since the radio link is shared by all baseband modems in the modular cluster. The frame sync signal is sourced by one modem to all other modems in the cluster via a signal on the backplane wiring.

During the search for the RCC if the AM hole is found to within 3 symbol periods of the start of frame marker, coarse acquisition is complete. The location of the unique word within the frame provides the modem with timing information that is used to bring the modem's local frame timing to within one symbol timing of the base station. The modem is said to be in receive sync, Rx__RCC, as long as it continues to receive and decode the unique word correctly. Once synchronization is achieved, 16PSK modulation corresponding to 4 bits per symbol, QPSK modulation corresponding to 2 bits per symbol, or combinations of both may be employed.

While all modems are capable of receiving and synchronizing to the base station's radio control channel RCC, only one modem need do this since the modem which is selected by the cluster controller can share its timing with the other modems via the Frame Sync signal over the backplane wiring. The selected modem will source the Frame Sync Out signal and all other modems will accept this signal as the Frame Sync In signal.

When a modem goes on line, its modem processor DSP/MDM instructs its DDF 450 (FIG. 3) to try to synchronize its local frame timing to the backplane signal. Each modem's DDF 450 timing is at this moment independent of every other modem's timing. DDF 450 will initially be instructed by its DSP/MDM to look at the backplane signal for its synchronization. If a backplane synchronization signal is present, the DDF will synchronize its frame sync signal to the backplane signal and then disconnect from the backplane signal. The backplane signal thus does not feed directly into the modem's timing circuitry but merely aligns the modem's internal start of receive frame signal. If a backplane synchronization signal was not present, it is assumed that the modem is the first one that has been activated by the cluster controller, in which case the cluster controller 300 will instruct the modem processor DSP/MDM to look for the RCC and send the modem's timing to the cluster controller.

Cluster controller 300 next instructs the modem processor DSP/MDM to demodulate the DBPSK signal on the RCC channel. The path for demodulation of the IF signal received from block converter 600 may be traced to the modem IF module where it is again band-pass filtered and downconverted to a 16 kilosymbol per second information stream. The DBPSK modulation that is employed on the RCC channel is a one bit per symbol modulation. The RCC messages that are received from the base station must be demodulated and decoded before being sent to the cluster controller. Only messages that are addressed to the cluster controller, have a valid CRC and are a burst type message or an acknowledgment message are forwarded to the controller. All other messages are discarded. An acknowledgment message signifies the correct reception of the previous RCC message. A message is addressed to the cluster controller if the Subscriber Identification number (SID) contained in the message matches the SID of the cluster.

Figure 4:
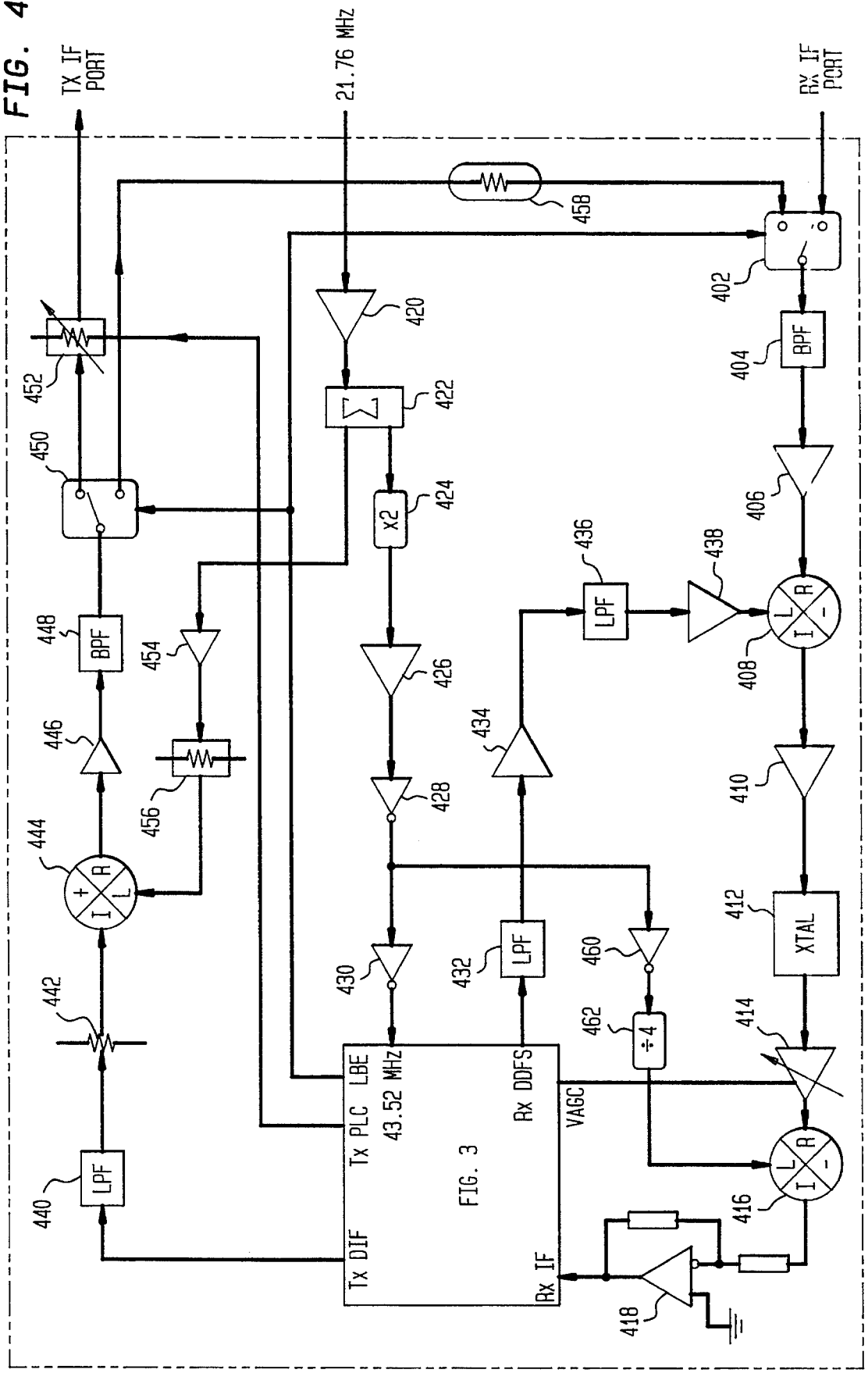
FIG. 4 shows the IF portion of the frequency agile modem.

Referring to FIG. 3, the 16 kilosymbol per second IF signal from the IF circuitry of FIG. 4 is entered into A/D converter 804, which is sampled at a 64 KHz rate by a clock signal received from DDF chip 450. A/D converter 804 performs quadrature bandpass sampling at a 64 kHz sampling rate. Quadrature band-pass sampling is described, inter alia, in U.S. Pat. No. 4,764,940. At its output, converter 804 provides a sequence of complex signals which contains a certain amount of temporal distortion. The output of converter 804 (FIG. 8) is entered into RxFIFO in DDF chip 450. Modem processor DSP/MDM reads the contents of RxFIFO and performs a complex FIR filtering operation, which removes the temporal distortion introduced by the quadrature band-pass sampling. After the removal of temporal distortion, the signals are demodulated by procssor DSP/MDM.

During the demodulation of RCC messages, AFC, AGC and bit tracking processes are perfomed by modem processor DSP/MDM to maintain the cluster in close synchronization with the base station. Transmit timing and power level adjustments are made according to information received in the RCC message. Processor DSP/MDM examines the demodulated data and detects the RCC message, a message which includes link status bits, and 96 bits of data that includes the subscriber ID. Modem processor DSP/MDM also recognizes whether the subscriber ID belongs to one of the subscriber line circuits in the cluster.

If the message is for this cluster, the message is passed to cluster controller 300, which interprets the RCC command. Forward RCC messages include page message, a call connect, clear indication and self-test. Reverse RCC messages include call accept, clear request, test results and call request. If the RCC message is a page message, the cluster controller for which it is designated will formulate a call accepted message to be transmitted back to the base station. From the call accepted message the base station determines the timing offset between the cluster and the base station and the base station sends symbol timing update information to the cluster in the next RCC message, which is the call connect message.

When the RCC message is a call connect message, the information therein instructs the cluster controller what adjustment to make in symbol timing, whether to adjust power level, fractional timing, and what channel to use for the remainder of the call (channel number, TDM slot number, whether QPSK or 16PSK modulation will be employed and what the subscriber line type is).

The first modem which has found the RCC is designated the RCC modem and its frequency offset, receive gain control Rx AGC, and start of frame information is considered valid and may be distributed to the other modems. The cluster controller receives the channel number information and decides which modem is to be instructed to tune up to the designated channel to handle the remainder of the call.

The final step toward total synchronization is the successful establishment of a voice channel. When a voice channel is established the last two synchronization parameters become valid: the transmit symbol timing and transmit symbol fractional timing. At this point, should another modem be activated by the cluster controller all of the necessary synchronization information is available to be provided to the modem, making the establishment of a voice channel much easier and quicker. A confidence level is calculated to evaluate the synchronization information of each modem. The cluster controller updates the confidence level for each modem whenever there is a change in sync status, link quality, or receive AGC. The cluster controller finds the modem with the highest confidence level and distributes its synchronization parameters to the remaining modems.

When a modem slot is commanded to enter the voice mode by the cluster controller, the modem first attempts to perform refinement. Refinement is the process of finely synchronizing the modem's transmit timing and power level to the base station's receive timing. The refinement process is controlled by the base station. The base station and the modem exchange special refinement bursts until the base station terminates the refinement process when the predetermined degree of synchronization has been achieved. The modem then goes into normal voice operation. If the base station aborts the refinement process, the modem will abort the call, go into the idle state and inform the cluster controller. Refinement bursts are DBPSK bursts formatted like RCC bursts. Refinement bursts are detected by the presence of a unique refinement word. The modem is said to be in voice synchronization when the refinement unique word is detected with zero offset. The forward and reverse voice codewords have a voice codeword check byte attached for error detection. The modem will report a loss of sync if 9 consecutive frames are received with voice codeword errors, at which time the cluster controller enters the recovery mode until a good codeword is found or until the modem is commanded out of this mode and placed into idle mode.

Based upon the synchronization state, cluster controller 300 determines the validity of the synchronization parameters provided by the modem. The table below shows which parameters are valid, based upon the current synchronization state of a modem. An "X" in the box indicates that the parameter is valid.

| Sync State | Freq. Offset | Symbol Time | Fract. Time | TxPLC | RxAGC | SORF |
|---|---|---|---|---|---|---|
| No sync | | | | | | |
| Rx Sync(RCC) | X | | | | X | X |
| Tx Sync(RCC) | X | | | X | X | X |
| Voice sync | X | X | X | X | X | X |

A 12-bit confidence factor word is computed by the modem to reflect the reliability of the synchronization parameters ascertained by the modem. The confidence factor word is assembled by concatenating the bits representing the voice and receive sync states of the modem with bits identifying the link quality and receive AGC parameters, as set forth in the following table:

| Bit Allocation | 11 | 10 | 9...8 | 7...0 |
|---|---|---|---|---|
| Field | Voice Sync | Rx Sync(RCC) | Link Quality | RxAGC |

The single bits 11 and 10 identify, respectively, whether or not the modem is in voice sync and receive sync. The two bits 9 and 8 identify four gradations of link quality, while the 8 bits allocated to receive AGC level indicate the level of gain required.

MODEM MODULE, FIG. 3

The principle components of the modem module are shown in FIG. 3. The modem module can support up to four simultaneous full duplex voice channels. The processing to dynamically handle all functions required by an active channel is partitioned between the cluster controller processor 320, (FIG. 1), and processors DSP/MDM and DSP/BB in each modem (FIG. 3). The cluster controller handles higher level functions including call set-up, channel allocation and system control. Modem processor DSP/MDM handles filtering, demodulation and routing of the incoming radio signals, formatting of data before transmission over the radio channel, and management of data flow between itself and baseband processor DSP/BB. Baseband processor DSP/BB performs the computationally intensive tasks of voice compression and expansion and, in addition, handles the PCM bus interface. In normal voice operation, modem processor DSP/MDM demodulates received symbols, packs them into a receive buffer and sends the voice data buffer to baseband processor DSP/BB for RELP synthesis and transmission to the subscriber line circuit over the PCM bus. The modem processor DSP/MDM also accepts compressed speech from baseband processor DSP/BB, formats it into TDMA bursts and sends it to the transmit pulse shaping filter FIR contained in DDF 450 for transmission over the radio link. The modem operates on both QPSK and 16PSK modulations (and DBPSK during refinement) under control of the cluster controller.

Processors DSP/BB and DSP/MDM each have a dedicated random access memory, SRAM/MDM and SRAM/BB, respectively. However, modem processor DSP/MDM may request access to the random access memory SRAM/BB by activating its DMA HOLD output and obtains such access using the data and address bus when the baseband processor DSP/BB activates its DMA ACK output signal.

Assignment of Time Slots

As described in the '375 patent, the RPU in the base station keeps track of the radio channels and time slots that are in use and assigns both the frequency and the time slot to be used on any call. A slot is selected which is in use by the least number of calls so that the call traffic can be more evenly distributed across all slots. However, in accordance with that aspect of the present invention which is concerned with minimizing the power expended at the remote modular cluster, calls are assigned so as to (a) minimize the number of active modems and (b) control the number of conversations simultaneously using the same time slots. Further, while it is desirable to employ 16PSK modulation in every time slot of a TDMA frame so that four complete calls can be accommodated, it is also important to permit QPSK calls to be made and to keep an alternate RCC slot available for synchronization purposes. Accordingly, the cluster and the base station must cooperate in the assignment of time slots to achieve these goals. The cluster keeps track of available time slots and the type of modulation being employed on each slot. The cluster then assigns priority levels to each available slot and maintains a matrix of priority values which takes into account the factors that (a) an alternate receive time slot (generally the first time slot) on some channel must be allocated for RCC synchronization, (b) adjacent time slots should be left available as long as possible so that QPSK calls can be handled if necessary, and (c) time slots should be assigned to handle calls without, if possible, activating a powered-down modem or assigning a slot that is already in use by a large number of other calls. The routine (in pseudo code) for achieving these goals is as follows:

| Prioritize Slot Routine | |
|---|---|
| List 1 = | all idle time slots available on already active modems for 16PSK calls and QPSK calls; |
| List 1A = | all idle modems; |
| List 2 = | List time slots whose use will not exceed the threshhold number of calls using the same time slot in the cluster; |
| List 2A = | List 1 minus List 2; |
| List 3 = | List 2 minus time slots on modems having adjacent time slots available (for QPSK calls); |
| List 3A = | List 2 minus time slots on modems not having adjacent time slots available (for QPSK calls); |
| List 4 = | List 3 minus time slots on modems not having a synchronization time slot available (slot 0 for the RCC); |
| List 4A = | List 4 minus time slots on modems having a synchronization time slot available; |
| Mark list 4 as first choice; | |

-continued

| Prioritize Slot Routine |
|---|
| Mark list 4A as second choice; |
| Mark list 3 as third choice; |
| Mark list 3A as fourth choice; |
| Mark list 2 as fifth choice; |
| Mark list 2A as sixth choice; |
| Mark list 1 as seventh choice; |
| Mark list 1A as eighth choice. |

The above Prioritize Slot Routine is called whenever the cluster receives an RCC page message from the base station or is about to formulate a call request message to the base station. When the base station responds with a call connect message containing the frequency, type of modulation and time slot to be used, the cluster once again performs the Prioritize Slot Routine to see if the slot selected by the RPU is still available. If still available, the slot is assigned to the call. However, if in the meantime the slot assignments have changed, the call will be blocked.

An example of how the Prioritize Slot Routine is executed under light and heavier traffic conditions may be helpful. Consider first the following table, which illustrates a possible condition of the modems and assigned time slots under light traffic conditions, just before one of the subscribers served by the modular cluster initiates a request for service:

| Modem | Time Slot | | | |
|---|---|---|---|---|
| | 0 | 1 | 2 | 3 |
| 0 | RCC | 16PSK | | |
| 1 | 16PSK | | QPSK | QPSK |
| 2 | IDLE | IDLE | IDLE | IDLE |
| 3 | " | " | " | " |
| 4 | " | " | " | " |
| 5 | " | " | " | " |

The above table indicates that modem 0 has slots 2 and 3 available, that modem 1 has slot 1 available and that modems 2, 3, 4 and 5 are powered-down, all of their time slots being idle. The cluster executes the Prioritize Slot Routine which determines that slots 1, 2 and 3, in that order, are the preferred slots to be assigned to handle the next 16PSK call and that for QPSK calls the preferred slots are 2 and 0, in that order. The cluster then sends a "call request" signal to the base station using the RCC word and informs the base station of this preference. In the table below the rationale for each of the priorities is set forth:

| Slot Priority 16PSK | Rationale | Slot Priority QPSK | Rationale |
|---|---|---|---|
| 1 | No new modems to power up; no increase in max slot activity; QPSK slots 2,3 kept available; RCC slot available. | 2 | (Same reason as 16PSK for slots 2,3) |
| 2 | New QPSK call requires new modem power up. | 0 | Requires new modem power up |
| 3 | | | |
| 0 | Requires new modem power up. | | |

Another example may be helpful. Consider the status of time slots among modems 0–5 under somewhat heavier traffic conditions, as shown in the following table, wherein empty boxes indicate idle time slots:

| Modem | Time Slot | | | |
|---|---|---|---|---|
| | 0 | 1 | 2 | 3 |
| 0 | RCC | 16PSK | QPSK | QPSK |
| 1 | QPSK | QPSK | 16PSK | |
| 2 | 16PSK | | 16PSK | 16PSK |
| 3 | QPSK | QPSK | QPSK | QPSK |
| 4 | 16PSK | 16PSK | | 16PSK |
| 5 | | 16PSK | | |

The slots to be assigned are set forth in the following table together with the rationale:

| Slot Priority 16PSK | Rationale | Slot Priority QPSK | Rationale |
|---|---|---|---|
| 3 | No new modems to power up; max slot activity avoided; QPSK slots 2,3 kept available; RCC slot kept available. | 2 | only choice |
| 2 | No new modems to power up; max slot activity avoided; RCC slot kept available, BUT, new QPSK call requires new modem power up. | | |
| 1 | No new modems to power up; QPSK slots 2,3 kept available; RCC slot kept available, BUT max slot activity exceeded. | | |
| 0 | No new modem power up; QPSK slots 2,3 kept available; BUT both max slot activity exceeded and RCC slot not kept available. | | |

Up/Down Converter 600

Figure 5:
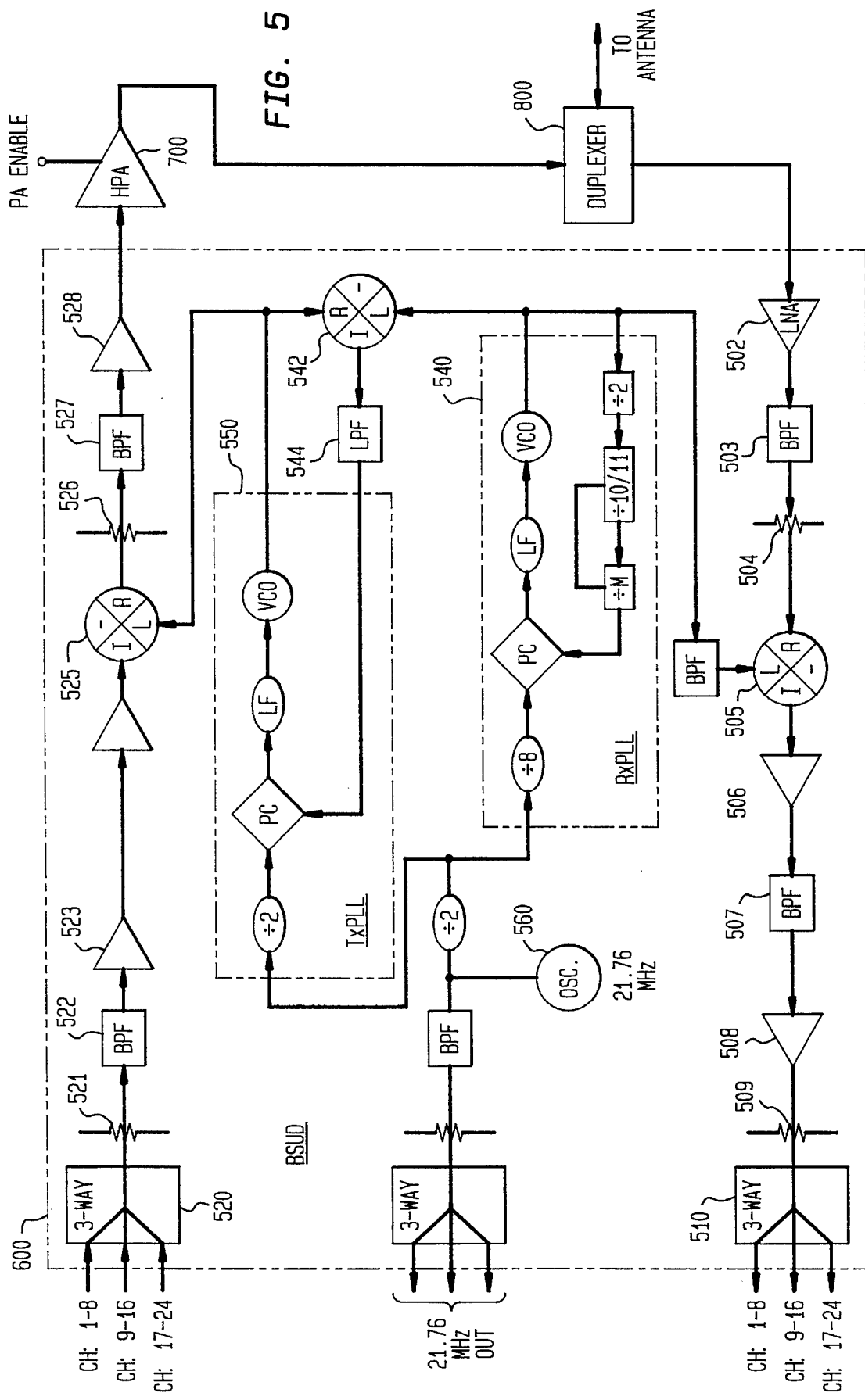
FIG. 5 is a block diagram of the block synthesizer, up/down converter.

In FIG. 5, forward channel radio signals from the base station are received in up/down converter 600 from the base station via duplexer 800. The received RF signal is passed through low-noise amplifier 502, band-pass filtered in filter 503, subjected to attenuation in attenuator 504 and applied to mixer 505, where it is subjected to a first down-conversion from the 450 MHz RF band or the 900 MHz RF band to an IF signal in the 26–28 MHz range. The IF signal is passed through amplifier 506, bandpass filter 507, amplifier 508 and attenuator 509 and applied to splitter circuit 510 for delivery to the common pool of modems.

The reverse channel modulated IF signals from the common pool of modems are applied to combiner 520 of block up/down converter 600 at the upper left-hand corner of FIG. 5., subjected to attenuation in attenuator 521, band-pass filtered in band-pass filter 522, amplified in amplifier 523 and applied to mixer 525, where the signal is up-converted to an RF signal in either the 450 MHz RF band or the 900 MHz RF band. The RF signal is then subjected to attenuation in attenuator 526, band-pass filtered in band-pass filter 527, amplified in amplifier 528 and applied to broadband high-power amplifier 700 which sends the signal on to duplexer 800.

Mixers 505 and 525 receive their reference frequencies from RxPLL phase locked loop circuit 540 and TxPLL phase lock loop circuit 550, respectively. Phase locked loop 540 generates a 1.36 MHz receive local oscillator signal from the signal provided by 21.76 MHz master clock 560, divided by 2 and then by 8. The 1.36 MHz signal furnishes the reference input to phase comparator PC. The other input to the phase comparator is provided by a feedback loop which divides the output of circuit 540 by 2 and then by 177. Feeding back this signal to the phase comparator causes the output of circuit 540 to have a frequency that is 354 times that of the reference input, or 481.44 MHz. The 481.44 MHz output of receive phase locked loop RxPLL 540 is applied as the local oscillator input to down-conversion mixer 505.

The 481.44 MHz output of circuit 540 is also applied as the reference input for circuit 550, so that circuit 550 is frequency slaved to circuit 540. Circuit 550 generates the transmit local oscillator signal, which has a frequency of 481.44 MHz+5.44 MHz, i.e. it has a frequency that is offset 5.44 MHz higher than the receive local oscillator. For circuit 550, the 21.76 MHz signal from master clock 560 is divided by 2, then by 2 again, to make a signal having a frequency of 5.44 MHz, which is presented to the reference input of phase comparator PC of circuit 550. The other input of phase comparator PC of circuit 550 is the low pass filtered difference frequency provided by mixer 542. Mixer 542 provides a frequency which is the difference between the receive local oscillator signal from circuit 540 and the VCO output signal of circuit 550. The output of circuit 550, taken from its internal VCO is a frequency of 481.44 MHz+5.44 MHz.

FIG. 4, IF Portion of Modem

FIG. 4 shows the details of the IF portion of the modem board in relation to the digital portions (whose details are shown in FIG. 3). At the lower right hand side of FIG. 4, the receive IF signal from BSUD 600 (FIG. 1) is applied through the lower terminal of loopback switch 402 to 4-pole band-pass filter 404 whose a passband extends from 26 to 28.3 MHz. The output of filter 404 is then amplified by amplifier 406 and down-converted in mixer 408 which uses a receive local oscillator signal having a frequency of between 15.1 MHz and 17.4 MHz. The output of mixer 408 is amplified by amplifier 410, and filtered by 8-pole crystal filter 412 whose center frequency is 10.864 MHz. The amplitude of the signal at the output of filter 412 is controlled by AGC circuit 414. The gain of AGC circuit 414 is controlled by the VAGC signal from DDF ASIC 450 of FIG. 3. The output of AGC circuit 414 is then down-converted by mixer 416, using a reference frequency of 10.88 MHz, to produce a 16 kilosymbol per second sequence of IF data, which passes through amplifier 418 and is delivered to the Rx IF input port of the circuitry of FIG. 3.

Still referring to FIG. 4, the circuitry of FIG. 3 generates a receive local oscillator signal, Rx DDFS, which is filtered by 7-pole filter 432, then amplified by amplifier 434. The output of amplifier 434 is again low pass filtered by 7-pole filter 436, whose output is amplified by amplifier 438, then mixed with the received IF radio signal in mixer 408.

At the right hand side of FIG. 4, amplifier 420 receives a master oscillator signal having a frequency of 21.76 MHz and applies the 21.76 MHz signal to splitter 422. One output of splitter 422 is doubled in frequency by frequency doubler 424, whose output is clipped in clipper 426 and shaped to TTL by gate 428, and inverted again by gate 430. The output of gate 430 is applied to the inset circuitry of FIG. 3 as a 43.52 MHz reference clock signal.

The other output of splitter 422 is passed through amplifier 454 and attenuator 456 and applied to the local oscillator (L) input of mixer 444. Mixer 444 up-converts the modulated IF signal, Tx DIF, from inset FIG. 3 after it has been low pass filtered by filter 440 and attenuated by attenuator 442.

The output of gate 428 also connects to the input of inverter 460, whose output is frequency divided by 4 by divider 462 and then used as a local oscillator to down-convert the output of AGC block 414 in mixer 416.

A loopback function is provided by the serial combination of switches 450 and 402 and dummy load 458 so so that signals from the Tx DIF ouput of the inset reference to the circuitry of FIG. 3 may be looped back to its Rx IF input for test purposes when training sequences are applied to compensate for signal distortions, such as that occuring within crystal filter 412.

Still referring to FIG. 4, the circuitry of FIG. 3 provides a modulated IF output, at a frequency of 4.64 to 6.94 MHz, which is filtered by 7-pole filter 440 and attenuated by attenuator 442. The output of attenuator 442 enters mixer 444, where it is up-converted to a frequency in the range of 26.4 MHz to 28.7 MHz. The output of mixer 444 enters amplifier 446, whose output is filtered by 4-pole bandpass filter 448 and applied to switch 450, which is controlled by the loop-back enable output LBE of the inset circuitry of FIG. 3. When loop-back testing is conducted lead LBE is energized causing switche 450 to connect the output of filter 448 to the top of dummy load 458 and energizing switch 402 to connect the bottom of dummy load 358 to bandpass filetr 404 for loop back testing. Loop-back testing is used with modem training sequences to compensate for signal distortions within crystal filter 412 and in other parts of modem circuitry.

When loop-back testing is not being conducted, the output of switch 450 is applied to programmable attenuator 452 which may be programmed to one of 16 different attenuation levels by the transmit power level control signal, Tx PLC, from the inset circuitry of FIG. 3. The output of attenuator 452 comprises the Tx IF PORT signal that is applied to the upper left-hand side of the BSUD, FIG. 5.

Figure 6:
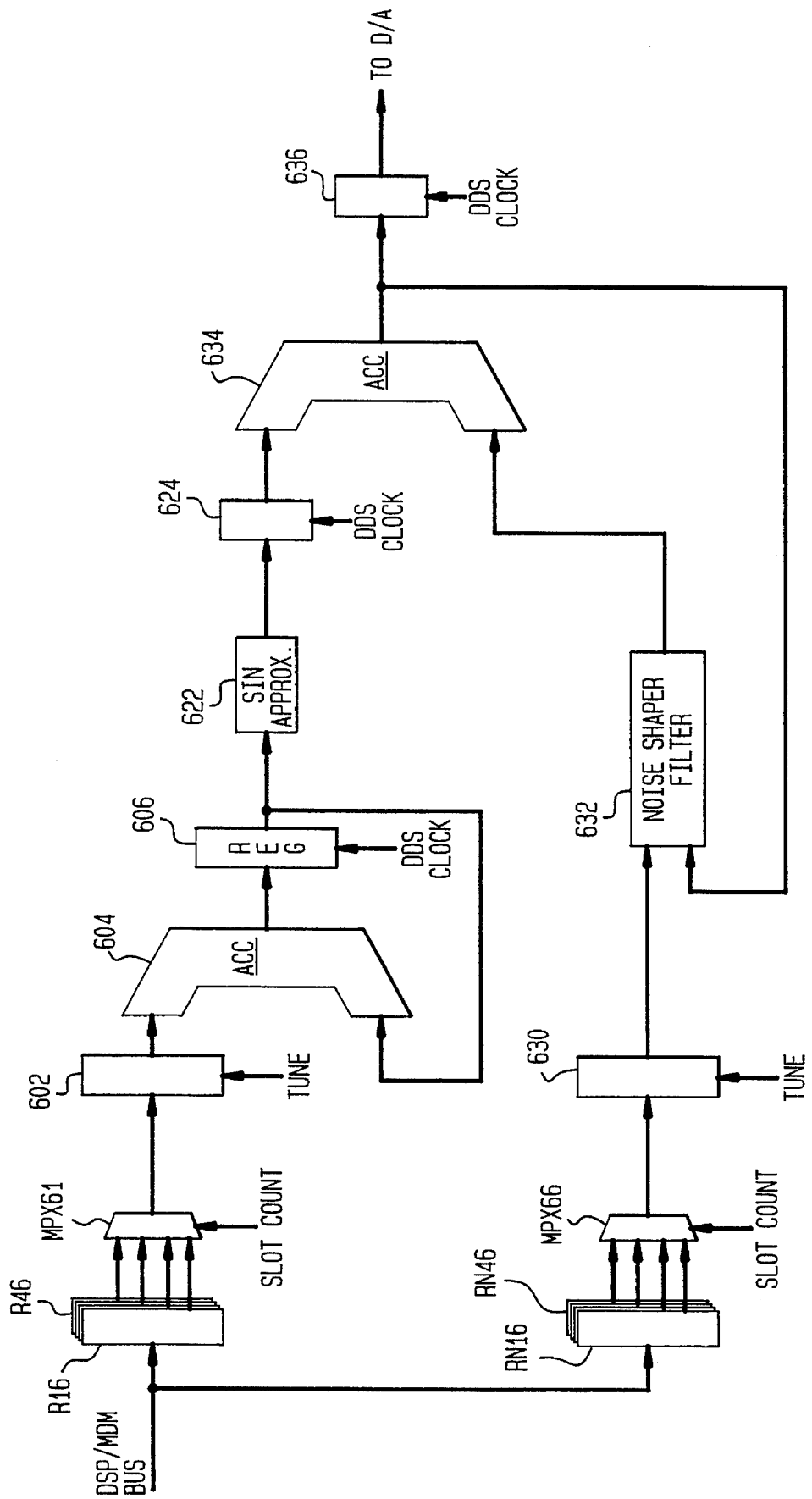
FIG. 6 shows the frequency synthesis and noise shaper for the receiver portion of the modem.

FIG. 6, RxDDS—Generation of Digital IF for Receive Channels

The exact intermediate frequency to tune to to for a receive time slot is determined when the cluster controller CC (FIG. 1) tells the modem which RF channel to search for the RCC message. During reception of the RCC message, fine tuning of frequency and timing is performed. The fine tuning is accomplished at the IF level using phase accumulator circuitry in the RxDDS circuit of the modem's DDF (FIG. 3), shown in detail in FIG. 6. The IF frequencies are generated by repetitively accumulating, at the frequency of a digital IF master clock, a number that represents a phase step in the phase accumulator. Modem processor DSP/MDM, via DSP/MDM data bus (FIG. 3), initially furnishes a 24-bit number F to the RxDDS circuitry. This number is related (as will hereinafter be described) to the desired IF frequency required to demodulate a particular incoming signal on a slot by slot basis.

The 24-bit number F is loaded into one of the four registers R16–R46 at the lefthand side of FIG. 6. In the illustrative embodiment where a 16-bit processor is employed, the 24-bit frequency number F is supplied in 16-bit and 8-bit segments, however, to simplify the drawing, the 24-bit number is shown as being entered into a composite 24-bit register. Each of registers R16–R46 is dedicated to one of the receive time slots. Since the RCC message is expected in the first Rx time slot, the 24-bit number is loaded into the corresponding one of the four registers R16–R46, e.g., register R16. At the appropriate slot count for the first Rx time slot, register R16's contents are presented to synchronization register 602, whose output is then presented to the upper input of adder 604. The output of adder 604 is connected to the input of accumulator register 606. The lower input of adder 604 receives the output of register 606. Register 606 is clocked by the 21.76 MHz DDS clock and its contents are, accordingly, periodically re-entered into adder 604.

The periodic reentry of the contents of register 606 into adder 604 causes adder 604 to count up from the number F first received from register R16. Eventually, adder 606 reaches the maximum number that it can hold, it overflows, and the count recommences from a low residual value. This has the effect of multiplying the DDS master clock frequency by a fractional value, to make a receive IF local oscillator signal having that fractionally multiplied frequency, with a "sawtooth" waveform. Since register 606 is a 24-bit register, it overflows when its contents reaches 224. Register 606 therefore effectively divides the frequency of the DDS clock by $2^{24}$ and simultaneously multiplies it by F. The circuit is termed a "phase accumulator" because the instantaneous output number in register 606 indicates the instantaneous phase of the IF frequency.

The accumulated phase from register 606 is applied to sine approximation circuit 622, which is more fully described in U.S. Pat. No. 5,008,900, "Subscriber Unit for Wireless Digital Subscriber Communication System." Circuit 622 converts the sawtooth waveform of register 606 into a sinusoidal waveform. The output of circuit 622 is resynchronized by register 624 and then applied to one input of adder 634, in a noise shaper consisting of adder 634 and noise shaper filter 632. The output of filter 632 is applied to the other input of adder 634. The output of adder 634 is connected to the data input of filter 632 and to the input of resynchronizing register 636. This variable coefficient noise shaper filter 632 is more fully described in U.S. Pat. No. 5,008,900. The noise shaper characteristics are controlled, on a slot by slot basis, by a 7-bit noise shaper control field which is combined with the least significant byte of the frequency number field received from the DSP/MDM BUS. The noise shaper may be enabled or disabled, up to 16 filter coefficients may be chosen, rounding may be enabled or disabled, and feedback characteristics within the noise shaper may be altered to allow the use of an 8 bit output DAC (as shown in FIG. 6) or a 10 bit output DAC (not shown) by asserting the appropriate fields in the noise shaper control field for each slot, in the four registers RN16–RN46. Multiplexer MPX66 selects one of the four registers RN16–RN46 for each slot, and the resulting information is resynchronized by register 630 and presented to the control input of noise shaper filter 632.

Figure 7:
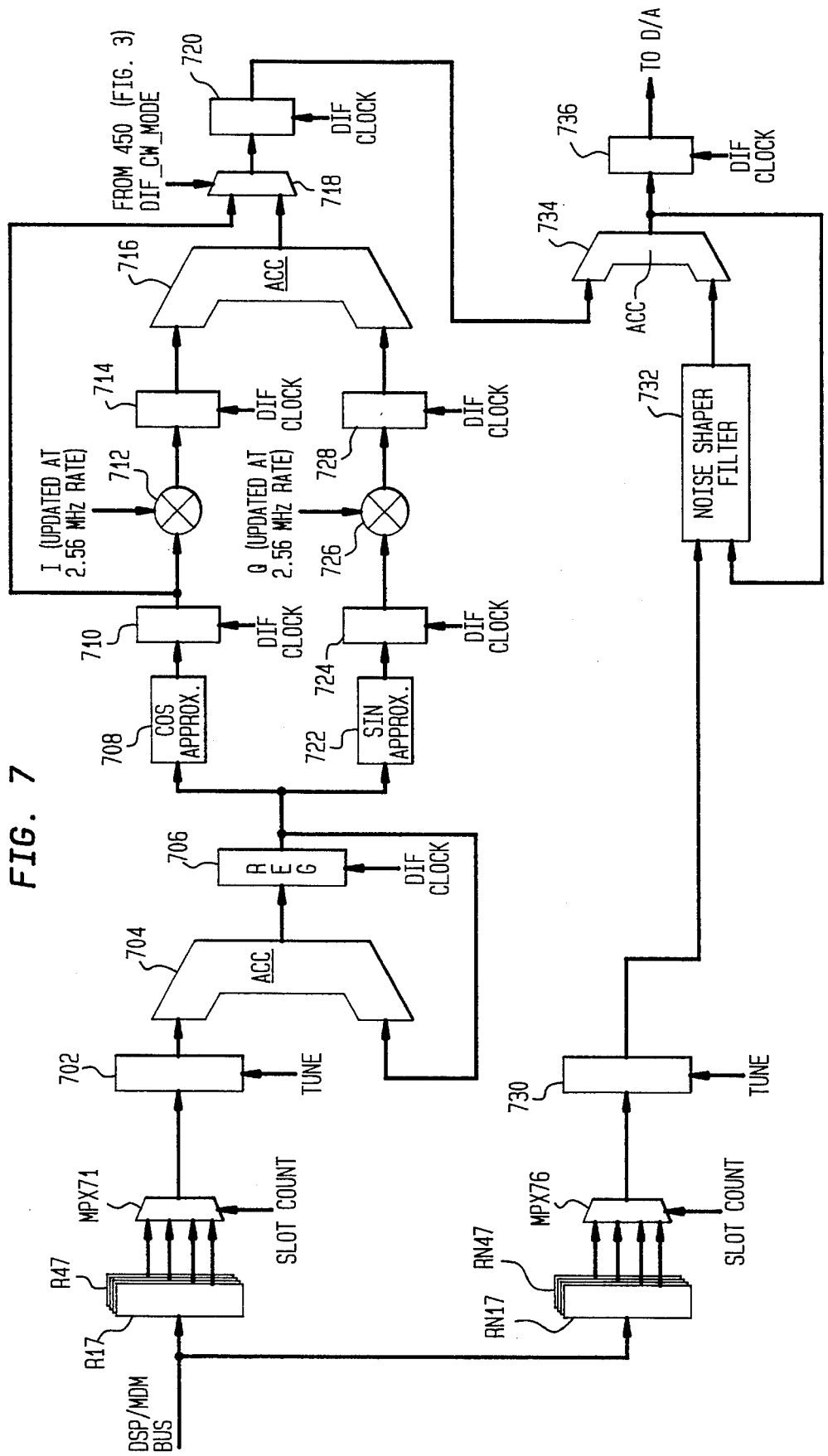
FIG. 7 shows the frequency synthesis, modulation and noise shaper circuitry for the IF transmitter portion of the modem.

FIG. 7, DDF—Digital IF Modulation

The exact IF frequency for any of the transmit channels is generated on a slot by slot basis by the TxDIF circuitry in the modem DDF block (FIG. 3), which is shown in detail in FIG. 7. On a slot by slot basis, an FIR transmit filter (not shown) shapes the 16 kilosymbol per second complex (I, Q) information signal data stream received from the modem DSP that will modulate each of the generated IF frequencies. The information signal data stream must be shaped so that it can be transmitted in the limited bandwidth permitted in the assigned RF channel. The initial processing of the information signal includes FIR pulse shaping to reduce the bandwidth to +/–10 KHz. FIR pulse shaping produces in-phase and quadrature components to be used in modulating the generated IF.

After pulse shaping, several stages of linear interpolation are employed. Initial interpolation is performed to increase the sample rate of the baseband signal, followed by additional interpolations, which ultimately increase the sample rate and the frequency at which the main spectral replications occur to 21.76 MHz. Suitable interpolative techniques are described, for example, in "Multirate Digital Signal Processing" by Crochiere and Rabiner, Prentice-Hall 1993. The in-phase and quadrature components of the shaped and interpolated modulating signal are applied to the I and Q inputs of mixers MXI and MXQ of the modulator portion of the circuitry shown in FIG. 7.

At the left-hand side of FIG. 7 is the circuitry for digitally generating the transmit IF frequency. The exact intermediate frequency to be generated is determined when the base station tells cluster controller CC (FIG. 1) which slot number and RF channel to assign to a time slot supporting a particular conversation. A 24-bit number which identifies the IF frequency to a high degree of resolution (illustratively +/–1.3 Hz), is supplied by processor DSP/MDM (FIG. 3) over the DSP/MDM data bus. The 24-bit frequency number is registered in a respective one of 24-bit registers R17–R47. Registers R17–R47 are each dedicated to a particular one of the four Tx time slots.

A slot counter (not shown) generates a repetitive two-bit time slot count derived from the synchronization signals available over the backplane, as previously described. The time slot count signal occurs every 11.25 ms, regardless of whether the time slot is used for DPSK, QPSK or 16PSK modulation. When the time slot to which the frequency will be assigned is reached by the slot counter, the slot count selects the corresponding one of registers R17–R47, using multiplexer MPX71, to deliver its contents to resynchronizing register 702 and ultimately, the upper input of adder 704. Accordingly, a different (or the same) 24-bit IF frequency can be used for each successive time slot. The 24-bit frequency number is used as the phase step for a conventional phase accumulator circuit comprising adder 704 and register 706. The complex carrier is generated by converting the sawtooth accumulated phase information in register 706 to sinusoidal and cosinusoidal waveforms using cosine approximation circuit 708 and sine approximation circuit 722. Sine and cosine approximation circuits 708 and 722 are more fully described in U.S. Pat. No. 5,008,900.

The outputs of circuits 708 and 722 are resynchronized by registers 710 and 724, respectively, and applied to mixers 712 and 726, respectively. The outputs of mixers 712 and 714 are applied to resynchronizing registers 714 and 728, respectively. Mixers 712 and 714 together with adder 716 comprise a conventional complex (I, Q) modulator. The output of adder 716 is multiplexed with the cosine IF reference by multiplexer 718, which is controlled by signal DIF_CW_MODE from an internal register (not shown) of DDF ASIC 450 (FIG. 3). The output of multiplexer 718 is resynchronized by register 720, whose output is connected to a variable coefficient noise shaper circuit, of a type as previously described in connection with FIG. 6, consisting of adder 734 and filter 732, with associated control registers RN17–RN47, control multiplexer MPX76, and resynchronizing registers 730 and 736.

This noise shaper compensates for the quantization noise caused by the finite resolution (illustratively +/– one-half of the least significant bit) of the digital to analog conversion. Since quantization noise is uniformly distributed, its spectral characteristics appear similar to white Gaussian noise. The noise power that falls within the transmitted signal bandwidth, which is relatively narrow compared to the sampling rate, can be reduced in the same ratio as the desired bandwidth bears to the sampling rate. For, example, assuming the modulating signal has a 20 kHz bandwidth and the sampling rate is 20 MHz, the signal to noise ratio improvement would be 1000:1 or 60 dB. The noise shaper characteristics are controlled, on a slot by slot basis, by a 7-bit noise shaper control field as described in connection with FIG. 6.

Figure 8:
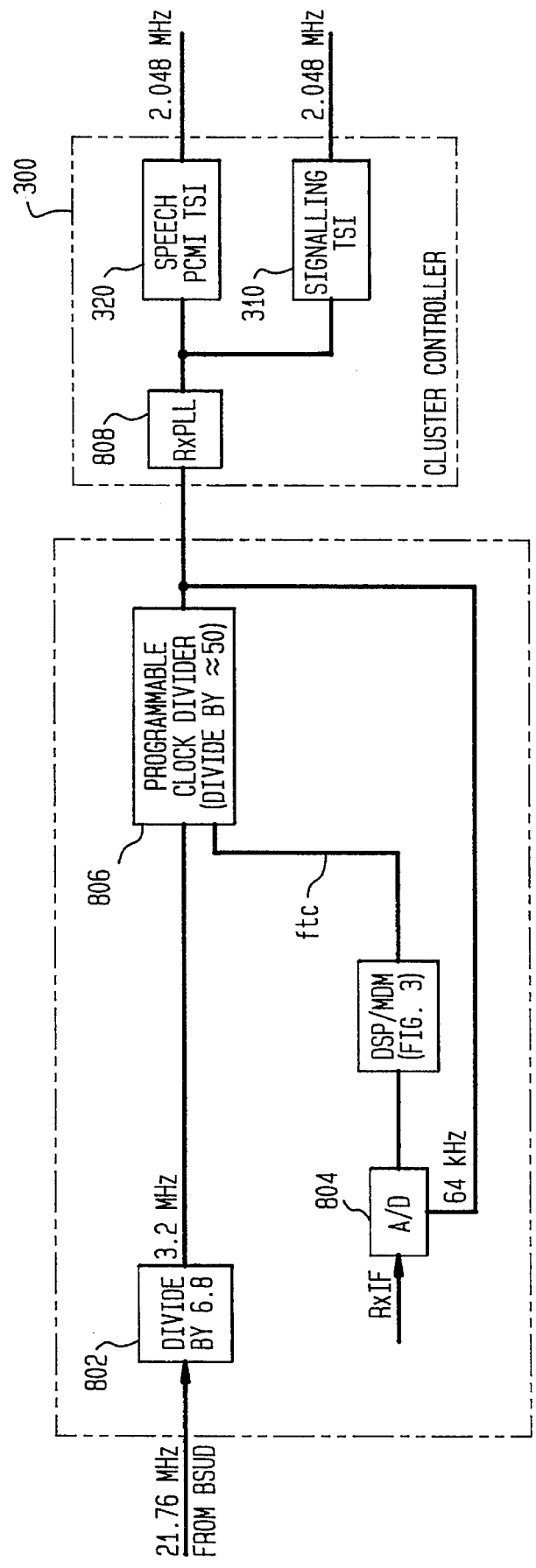
FIG. 8 shows the system clock generation circuitry for the modular cluster.

FIG. 8 System Clock Generation

It is an important aspect of our invention that voice quality is maintained despite the physical separation between the base station and the remote cluster. Timing variations between the base station and the cluster, as well as timing variations in the decoding and encoding of speech signals, will lead to various forms of voice quality degradation, heard as extraneous pops and clicks in the voice signal. In accordance with our invention, strict congruency of timing is assured by synchronizing all timing signals, especially those used to clock the A/D converter, the voice codecs on quad line modules 101–108, as well as PCM highways 200 and 500, to the forward radio channel. Referring to FIG. 8, the principal clocks used in the system are derived from a 21.76 MHz oscillator (not shown), which provides its signal at the lefthand side of FIG. 8. The 21.76 MHz signal is used to synchronize a 64 kHz sample clock to symbol transition times in the received radio signal. More particularly, the 21.76 MHz signal is first divided by 6.8 by fractional clock divider circuit 802, which accomplishes this fractional division by dividing the 21.76 Mhz clock by five different ratios in a repetitive sequence of 6, 8, 6, 8, 6, to produce a clock with an average frequency of 3.2 MHz.

Programmable clock divider 806 is of a conventional type and is employed to divide the 3.2 MHz clock by a divisor whose exact magnitude is determined by the DSP/MDM. Normally, programmable clock divider 806 uses a divisor of 50 to produce a 64 kHz sampling clock signal at its output. The 64 kHz sampling clock output of divider 806 is used to strobe receive channel A/D convertor 804 (also shown in FIG. 3). A/D converter 804 converts the received IF samples into digital form, for use by the DSP/MDM processor.

Still referring to FIG. 8, the DSP/MDM processor acts as a phase/frequency comparator to calculate the phase error in the received symbols from their ideal phase values, using the 64 kHz sampling clock to determine the moments when the phase error is measured. The DSP/MDM processor determines the fractional timing correction output ftc. Fractional timing correction output ftc is applied to programmable divider 806 to determine its divide ratio. If the 64 kHz sampling clock is at a slightly higher frequency than the symbol phase transitions in the received IF signal, the DSP/MDM processor outputs a fractional timing correction that momentarily increases the divisor of divider 806, thus extending the phase and lowering the average frequency of the 64 kHz sampling clock output of divider 806. Similarly, if the 64 kHZ sampling clock frequency is lower than the frequency of the received symbol phase transitions, the divide ratio of divider 806 is momentarily reduced.

The 64 kHz sampling clock at the output of programmable clock divider 806 is frequency-multiplied by a factor of 64, using a conventional analog phase locked multiplier circuit 808, to make a 4.096 MHz clock. The 4.096 MHz clock is delivered to time slot interchangers 310 and 320 (see FIG. 1). Time slot interchangers 310 and 320 divide the 4.096 MHz clock by two, to form two 2.048 MHz clocks, which are used by the voice codecs on line modules 101–108 (FIG. 1) to sample and convert analog voice inputs to PCM voice. Providing a commonly derived 2.048 MHz clock to the voice codecs which is in synchronism with the radio-derived 64 kHz sampling clock assures that there will be no slips between the two clocks. As mentioned, such slips would otherwise result in audible voice quality degradations, heard as extraneous pops and clicks in the voice signal.

The foregoing has described an illustrative embodiment of our invention. Further and other embodiments may be devised by those skilled in the art without, however, departing from the spirit and scope of our invention. Among such variations, for example, would be increasing the sampling rate on the PCM buses to make possible the handling of both PCM speech and signalling on the same time slot interchanger without degrading the quality of the PCM speech coding. In addition, the circuitry of the ASIC transmit pulse shaping may be modified to permit forms of modulation other than PSK, such as QAM and FM, to be employed. It should be understood that although the illustrative embodiment has described the use of a common pool of frequency agile modems for serving a group of remote subscriber stations in a modular cluster, a similar group of frequency agile modems may be employed at the base station to support communications between the cluster and any number of remote subscriber stations. Lastly, it should be appreciated that a transmission medium other than over the air radio, such as coaxial cable or fiber optic cable, may be employed.

What is claimed is:

1. A radio telephone system comprising a base station, a plurality of remote subscriber stations, means defining a repetitive set of time slots for supporting radio communications between said subscriber stations and said base station, and a group of modems, each of said modems being capable of directly digitally synthesizing any of a plurality of channel-identifying frequencies on successive ones of said time slots to support communications between different ones of said subscriber stations and said base station on successive ones of said time slots.

2. A radio telephone system comprising a base station, a plurality of remote subscriber stations, means defining a repetitive set of time slots for supporting radio communications between said subscriber stations and said base station, a group of modems, each of said modems being capable of directly digitally synthesizing any of a plurality of channel-identifying frequencies on successive ones of said time slots, and means for assigning any of said modems to support communications between said subscriber stations and said base station on successive ones of said time slots simultaneously on different ones of said channel-identifying frequencies.

3. A radiotelephone system according to claim 2 wherein said means for assigning said modems assigns all of said set of time slots to one of said modems before assigning a time slot to any remaining ones of said modems.

4. A radiotelephone system according to claim 3 wherein said remaining ones of said modems reside in a powered-down state until assigned to a time slot by said assigning means.

5. A radiotelephone system according to claim 2 wherein said means for assigning said modems includes means for synchronizing said modems with said base station.

6. A radiotelephone system according to claim 5 wherein said means for synchronizing includes means for sequentially directing certain of said plurality of modems to search through said channel-identifying frequencies during one of said time slots.

7. A radiotelephone system according to claim 3 wherein said one of said modems assigned by said assigning means provides synchronization information to said remaining ones of said modems.

8. A radiotelephone system according to claim 7 wherein certain of said modems compute a respective set of synchronization parameters, wherein said assigning means ascertains the reliability of said respective sets of synchronization parameters, and wherein said assigning means identifies said one of said modems to deliver said synchronizing information to the remaining ones of said modems.

9. A radiotelephone system according to claim 2 further comprising means for up-converting a plurality of said channel-identifying frequencies into a radio frequency band.

10. A radiotelephone system according to claim 2 further comprising means for down-converting radio frequency band signals received from said base station into a plurality of channel-identifying intermediate frequencies.

11. A method of minimizing synchronization delay and power consumption in a cluster of subscriber line circuits served by a plurality of modems having access to any of a plurality of channel-identifying frequencies during a set of repetitive time slots, comprising:
   a. synchronizing a first of said modems to one time slot of said set;
   b. distributing from said first of said modems to the remaining ones of said modems said one time slot synchronization; and
   c. allocating said channel-identifying frequencies to said set of time slots employed by said first of said modems before allocating a time slot to any remaining ones of said plurality of modems.

12. A radio telephone system comprising a central office base station, a plurality of remote subscriber stations, means defining a repetitive set of time slots for supporting radio communications between said subscriber stations and said central office station, a modem for directly digitally synthesizing any of a plurality of channel-identifying frequencies, and means for assigning said modem to any of said frequencies on successive ones of said time slots to support communications between different ones of said subscriber stations and said base station.

13. A radio telephone system comprising a central office base station, a plurality of remote subscriber stations, means defining a predetermined number of repetitive time slots for supporting radio communications between said subscriber stations and said central office station, a group of modems, each of said modems being capable of directly digitally synthesizing a plurality of channel-identifying frequencies, and means for assigning to each of said modems as many of said channel-identifying frequencies as said predetermined number of said time slots to support communications between said subscriber stations and said central office station on successive ones of said time slots.

* * * * *